Dec. 13, 1927.

J. W. GROSS

CHECKROW CORN PLANTER

Filed Feb. 14, 1927

1,652,714

Inventor

JOHN W. GROSS,

By Shepherd Campbell

Attorney

Patented Dec. 13, 1927.

1,652,714

UNITED STATES PATENT OFFICE.

JOHN W. GROSS, OF UNIOPOLIS, OHIO.

CHECKROW CORN PLANTER.

Application filed February 14, 1927. Serial No. 168,213.

This invention relates to improvements in check row corn planters and more particularly to the check row corn planter shown in U. S. Patent 1,593,070, issued to me on July 20, 1926.

The patent referred to discloses a check row corn planter wherein a floatingly mounted, ground engaging trip wheel serves to discharge the seed from the hoppers into drilling hoes at the proper time.

The device of the present invention is the same, in principle, as that of my aforesaid patent. The present invention relates to certain improvements in the manner of mounting the trip wheel.

Further objects and advantages of the invention will be set forth in the detailed description which follows.

In the accompanying drawings.

Like numerals designate corresponding parts in all of the figures of the drawing.

Figure 1:
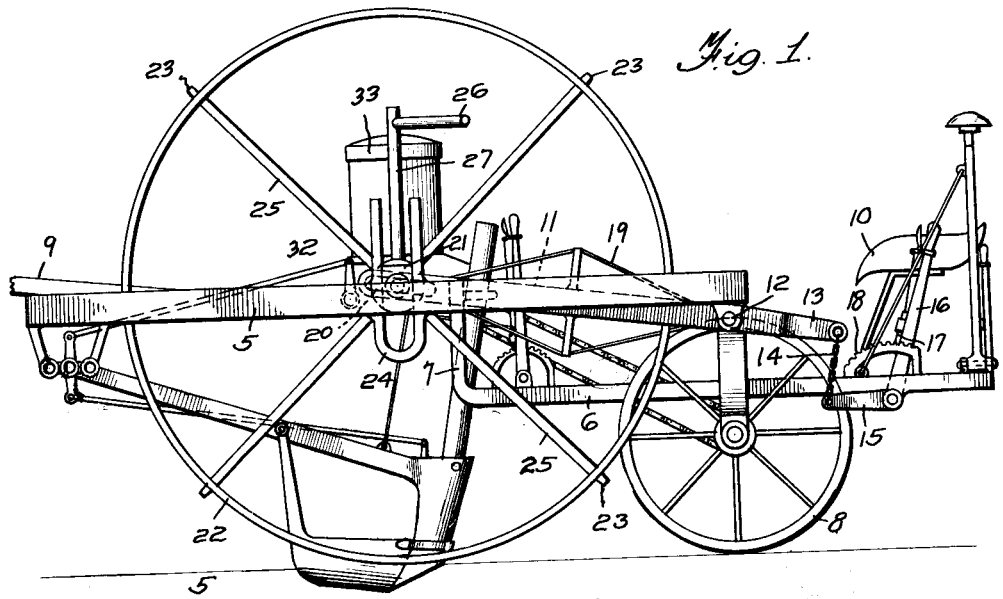
Fig. 1 is a side elevation of a check row corn planter constructed in accordance with the invention.
Figure 2:
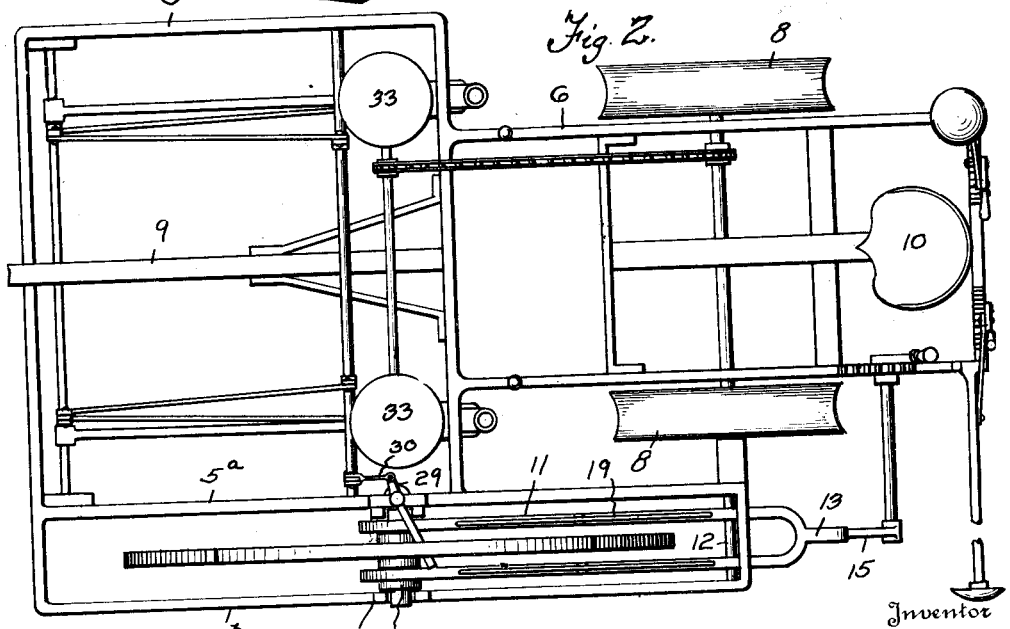
Fig. 2 is a plan view thereof.

The planter of the present invention comprises an upper forward frame 5 and a lower rear frame 6, said frames being rigidly connected by the vertical members 7. The composite frame formed by the parts 5 and 6 is mounted upon ground wheels 8, and is provided with a tongue 9 to which draught animals may be attached. A driver's seat 10 is spaced to such a distance rearwardly of the ground wheels 8 that the weight of the driver tends to counter-balance the weight of the seed hoppers, hoes, yoke, etc., which are disposed forwardly of the ground wheels.

Figure 3:
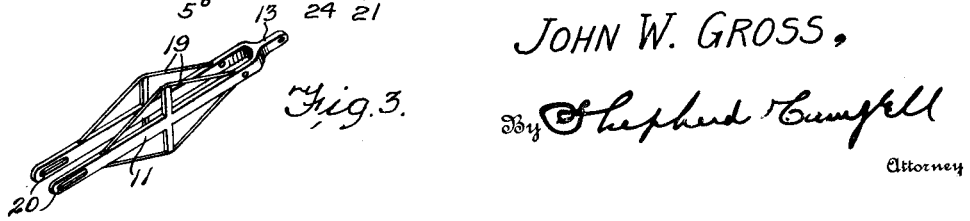
Fig. 3 is a perspective view of the floating yoke by which the trip wheel is carried.

The frame 5 comprises spaced side members 5ª and 5ᵇ. A yoke 11 of elongated U-shape has vertical movement between the members 5ª and 5ᵇ, said yoke being pivoted upon a pin 12. A rearward extension or tail 13 of said yoke is connected by a chain or other flexible connection 14 with one arm 15 of a bell crank lever 16. Said lever is provided with a conventional type of latch 17 moving over a toothed sector 18. It is apparent that by releasing the latch and throwing the lever forwardly, the tail 13 will be drawn downwardly and the forward end of the yoke will be elevated. As is clearly indicated in Fig. 3, the yoke 11 is rendered sufficiently strong and rigid by struts 19, and the free ends of the yoke are slotted as indicated at 20 for engagement with the journal boxes 21 of trip wheel 22, the periphery of said wheel carrying teeth 23 to effect proper marking off of the ground. The journal boxes 21 are slidably mounted for vertical movement in fixed yokes 24 which are carried by the members 5ª and 5ᵇ. Thus it will be seen that, like the structure of the patent referred to, the trip wheel can be bodily lifted out of engagement with the ground, and at the same time its movement in a line substantially perpendicular to the frame 5, and the maintenance of its proper relation to the trip, hereinafter described, is insured. The trip wheel 22 comprises spokes 25 which, during the movement of the wheel as the planter travels over the ground, engage the horizontally projecting arm 26 of a vertical trip shaft 27, the lower end of which is pivoted in a bracket 28 of the member 5ª of the frame. The lower portion of the trip shaft 27 carries a crank arm 29 which is connected by a suitable link 30 with a like crank arm 31 upon a transverse rock shaft 32. Like the corresponding shaft of my aforesaid patent, said rock shaft 32 is the conventional rock shaft commonly employed for actuating the upper seed valves commonly employed in corn planters. For the purposes of illustration I have shown two conventional seed hoppers 33, but it is to be understood that I may employ as many of these as may be desired.

As before stated the main features of this machine are the same as illustrated in my Patent 1,593,070. Therefore for purposes of clarity this description will be restricted to a discussion of those features wherein the present invention differs from the invention of the patent referred to. By mounting the yoke 11 in the manner shown and by constructing the yoke in the manner illustrated, the parts are rendered stronger, the operating connections for the yoke are simplified and the yoke is, in a measure, counter-balanced. In addition, the new arrangement of the yoke is more effective in the matter of guiding the trip wheel and in preventing any tendency of the same to twist out of proper alignment.

It is to be understood that the invention is not limited to the precise arrangement set forth but that it includes within its purview whatever changes fairly come within either the terms or the spirit of the appended claims.

Having described my invention what I claim is:

1. In a check row corn planter, a supporting frame, ground wheels for the same, a relatively large trip wheel, vertical guides for said trip wheel, a bifurcated yoke pivoted intermediate its ends for vertical swinging movement, the arms of said yoke being slotted at one end and being engaged with the journals of the trip wheel, an operating lever of bell crank formation and a connection between one arm of said lever and the rear end of the yoke.

2. In a check row corn planter, a supporting frame, ground wheels for the same, a relatively large trip wheel, vertical guides upon the frame for said trip wheel and in which said trip wheel has vertical movement, a bifurcated yoke pivoted upon the frame, materially nearer its rear end than its forward end, the forward ends of the arms of the yoke being slotted and engaged with the journals of the trip wheel, an operating member and a connection between said operating member and the rear end of the yoke.

3. In a check row corn planter, a supporting frame, ground wheels for the same, a relatively large trip wheel, vertical guides for said trip wheel, a bifurcated yoke pivoted intermediate its ends for vertical swinging movement, the arms of said yoke being slotted at one end and being engaged with the journals of the trip wheel, a flexible member connected to that portion of the yoke which projects rearwardly of its pivot point and an operating lever to which said flexible member is connected.

In testimony whereof I affix my signature.

JOHN W. GROSS.